Aug. 25, 1942.  W. V. THELANDER  2,293,781
FRICTION CLUTCH PLATE
Filed July 22, 1939

Inventor:
W. Vincent Thelander
By McCanna, Wintercorn & Morebach
Attys.

Patented Aug. 25, 1942

2,293,781

UNITED STATES PATENT OFFICE 2,293,781

FRICTION CLUTCH PLATE

W. Vincent Thelander, Rockford, Ill.

Application July 22, 1939, Serial No. 285,840

4 Claims. (Cl. 192—68)

This invention relates to improvements in friction clutches for motor vehicles and is particularly concerned with a new and improved clutch plate.

Clutch plates have been spring cushioned to dampen vibrations, and along with the spring cushioning means many have seen fit to provide frictional means of one kind or another to resist relative movement between the plate and its hub, the theory being that the larger and harsher power impulses are absorbed by the spring cushioning means whereas the minor engine vibrations, which when synchronized with the vibrations from the rear portion of the transmission train set up a high frequency noise, are absorbed or dampened by the separate braking means. However, realizing that to be mere theory which moreover meant the addition of complicated and expensive construction, which if it could be eliminated or at least simplified would make possible the manufacture of clutch plates at much lower cost, I experimented and gradually reduced the friction lag or drag and found that there was less and less vibration and noise noticeable in the car. I have, therefore, come to the conclusion that the more accurate theory is this:

The springs for cushioning purposes are in and of themselves a vibration dampening means in addition to transmitting power, and it is therefore to no purpose to tie together by friction means the relatively rotatable plate and hub but the addition of such friction means serves only to conduct to an undesired degree vibrations from the rear portion of the transmission train to the plate, which then acts as a sounding board or diaphragm amplifying the audible noises. It is therefore the principal object of my invention to provide a spring cushioned clutch plate devoid of frictional braking means and in fact specially constructed with a view to obtaining as nearly as possible zero friction lag or drag between the plate and its hub. It is also an important object to have the plate of sectional construction so as to reduce whatever small amount of sounding board or diaphragm effect might otherwise still be noticeable.

Another important object of my invention is to provide a sectional clutch plate which while it has maximum clearance relationship with the hub for minimum friction lag or drag, for the reasons above indicated, is nevertheless maintained in true centered relationship with the hub by a one-piece centrally perforated circular sheet metal disc having accurate bearing contact with the hub in its center hole to maintain the centered relationship without materially increasing the friction drag.

The invention is illustrated in the accompanying drawing, in which—

The same reference numerals are applied to corresponding parts throughout the views.

Figure 1:
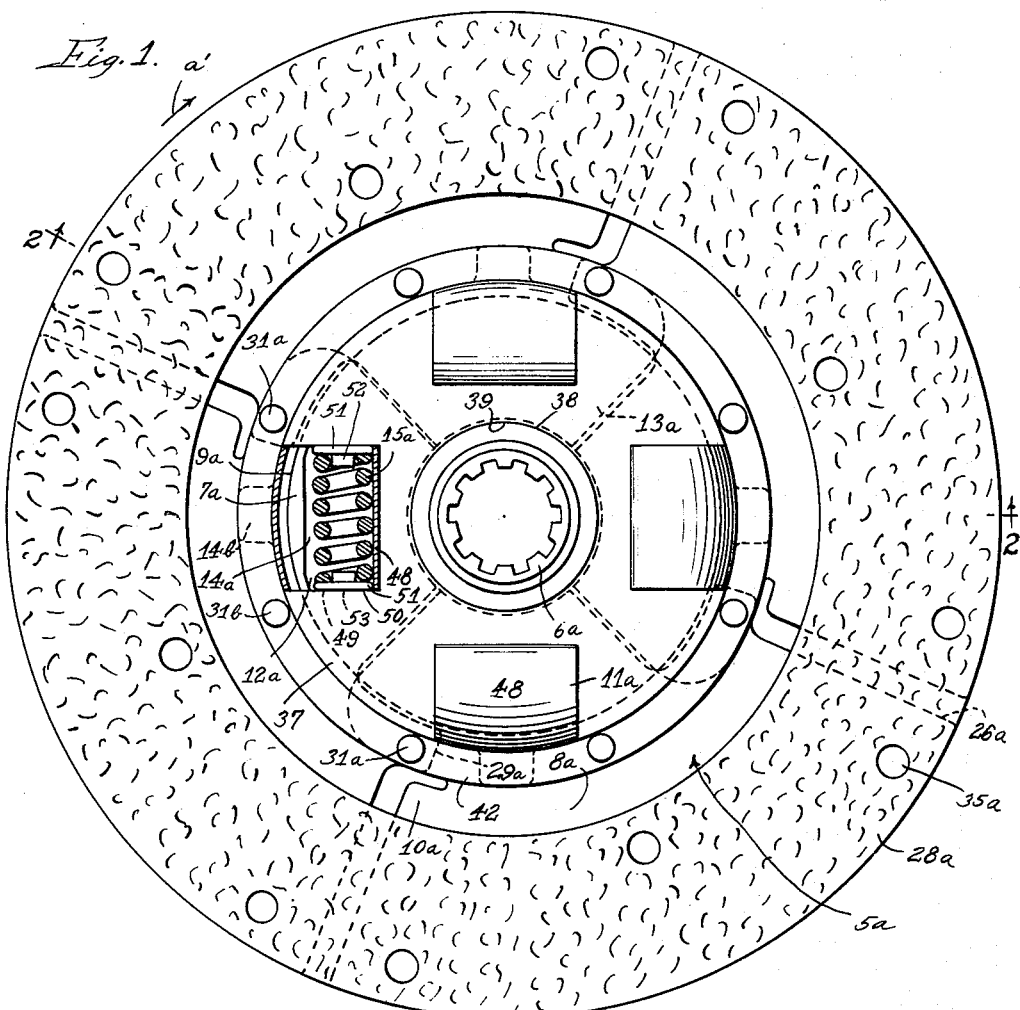
Figure 1 is a face view of a clutch plate made in accordance with my invention showing three of the spring pockets in outside elevation and the fourth in longitudinal section.
Figure 2:
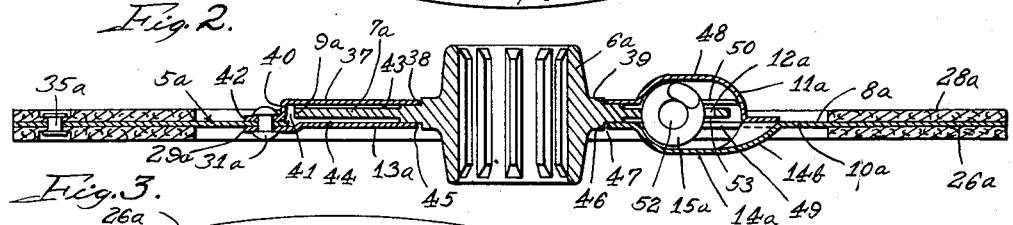
Fig. 2 is a cross-section on the line 2—2 of Figure 1.

The clutch plate herein shown at 5a is generally similar to that disclosed in my Patent 2,244,134, and comprises relatively rotatable inner and outer portions, the inner portion being formed by a center hub 6a splined for driving connection with the driving shaft of the transmission and provided with an annular flange 7a onto which the outer portion 8a of the plate is adapted to be assembled in true concentric relation with the circular periphery 9a of the flange. The outer portion 8a is made up of a single set of plate sections 10a equal in number to the number of spring pockets 11a, there being in this instance a circular sheet metal hub plate 37 on the opposite side of the flange 7a of the hub 6a from the series of plate sections 10a. The hub plate 37 has a circular center hole 38 which has a loose working fit on an annular shoulder 39 provided on the hub 6a in concentric relation therewith whereby to keep the plate 37 in truly centered relation with the hub. The plate 37 is dished so as to provide an annular rim 40 in wide clearance relationship to the outer circular periphery 9a of the flange 7a as indicated at 41, the rim 40 terminating in an annular flange 42 to which all of the plate sections 10a are arranged to be riveted as at 31a. The flange 7a, it will be noticed, is reduced in thickness outwardly from the shoulder 39 to leave wide clearances between the hub plate 37 and the flange 7a, as indicated at 43, the hub plate thus having engagement with the hub 6a only adjacent the annular shoulder 39. The same clearance relationship exists between the plate sections 10a and the other side of the flange 7a by reason of this reduction in thickness, as indicated at 44. The plate sections 10a extend radially inwardly alongside of the flange 7a so that their arcuate inner peripheries 45 come close to but are definitely spaced from the annular shoulder 46 on that side of the hub 6a, the clearance therebetween being indicated at 47. The object in this is to utilize only the plate 37 for centering purposes and to keep the plate sections 10a out of contact with the hub 6a so far as possible in order to proportionately reduce friction drag. The flange 7a has substantially rectangular openings 12a provided therein to accommodate coiled compression springs 15a, and the plate sections 10a have substantially rectangular struck out loop portions 14a to form half of the spring pockets 11a, the other half of each of said pockets 11a being provided by substantially rectangular struck out loop portions 48 on the hub plate 37. In other words, the sheet metal of the plate sections 10a and of the hub plate 37 is sheared along parallel lines and the material between these lines is stretched between dies to form the loop portions 14a and 48 respectively. Driving faces 49 are thus formed on the plate sections 10a adjacent opposite ends of the loop portions 14a, and in a similar manner there are driving faces 50 formed on the hub plate 37 adjacent opposite ends of the loop portions 48, the driving faces being of course on the parallel lines of shearing previously mentioned incidental to the forming of the loop portions 14a and 48. Buttons 51 having small central projections 52 to fit in the ends of the springs 15a are provided for the opposite ends of each spring for engagement with the driving faces 49 and 50 on the plate sections 10a and hub plate 37 respectively and also to engage the driving faces 53 provided on the flange 7a at opposite ends of each of the openings 12a.

In the operation of this clutch plate, the torque is transmitted through the springs 15a, the buttons 51 at the trailing ends of the springs 15a being arranged when drive is transmitted to the plate 5a in a clockwise direction, as indicated by the arrow a', to have engagement with the driving faces 49 and 50 on the plate sections 10a and hub plate 37, whereas the buttons 51 on the leading ends of the springs 15a have engagement with the driving faces 53 on the flange 7a to transmit drive from the plate 5a to the hub 6a. When the car coasts and the hub 6a becomes the driver, the situation just described is reversed and the buttons which were previously engaging driving faces 53 on the flange 7a engage driving faces 49 and 50 on the plate sections 10a and hub plate 37 respectively. The present construction, due to the reduced bearing engagement at 38 between the hub plate 37 and hub 6a and the clearance relationship otherwise provided for between the outer section 8a and the flange 7a, as indicated at 41, 43, and 44, operates very quietly; no frictional braking means is provided, but instead the springs 15a are relied upon solely for dampening vibrations in addition to cushioning the drive, and due to the floating relationship between the outer section 8a of the plate and the flange 7a of the hub, the transmission of vibration from the hub 6a to the plate is reduced to a minimum. As previously stated the bearing engagement at 38—39 is only sufficient to maintain a centered relationship between the plate and hub and very little vibration is apt to be transmitted from the hub to the plate there. Furthermore the sectional construction of the plate has a tendency to deaden sound so that this plate does not have the tendency of others to act as a sounding board or diaphragm.

Figure 3:
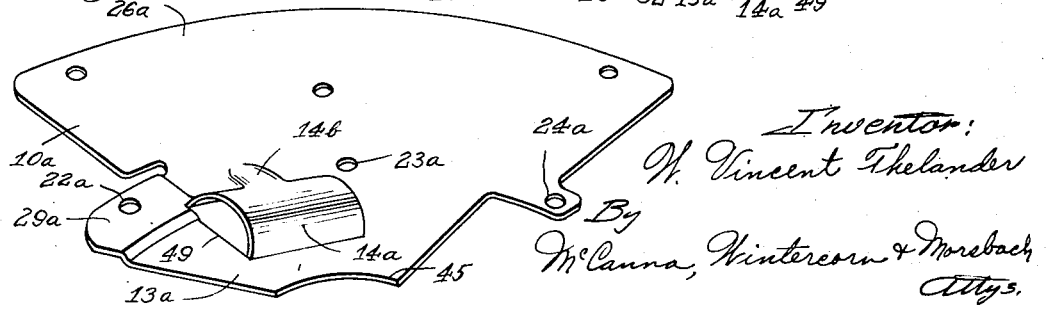
Fig. 3 is a perspective view of one of the stampings used in the construction of the plate shown in Figs. 1 and 2.

The assembling of the sections 10a in this plate is obviously a simple matter because of the fact that there is only one set of plate sections on one side of the flange 7a, the hub plate 37 cooperating with the other side of said flange. Each plate section 10a as clearly appears in Fig. 3 has three rivet holes 22a, 23a, and 24a, and that portion 29a in which the rivet hole 22a is provided is struck out of the plane of the rest of the plate section just enough to overlap the adjoining end of the next plate section so that the rivet hole 24a of the next section can be brought in register with the rivet hole 22a. The alternate rivets 31a therefore pass through the overlapping portions of the plate sections 10a as well as through the flange 42 of the hub plate 37, whereas the intermediate rivets 31b pass through only a plate section and the abutting flange 42 of the hub plate 37. The rest of each plate section 10a except for the struck out loop portion 48 and a struck out reinforcing radially extending boss 14b is all in one plane as clearly appears in Fig. 5. The segmental-shaped inner end portions 13a of adjacent plate sections serve to enclose the opposite side of the flange 7a from the hub plate 37, whereas the outer segmental-shaped portions 26a provide support for annular facings 28a of suitable composition material, usually containing asbestos, each plate section having three rivets 35a passing therethrough to secure the annular facings 28a on opposite sides thereof.

It is believed the foregoing description conveys a good understanding of the objects and advantages of my invention. The appended claims have been drawn to cover all legitimate modifications and adaptations.

I claim:

1. A clutch plate comprising a center hub having an annular flange and also having at least on one side thereof an annular shoulder provided thereon of smaller radius than the flange, a hub plate having a central circular opening provided therein for rotatably mounting the hub plate on the annular shoulder on the hub whereby said hub plate is held in concentric relation with the hub adjacent one side face of the flange, a plurality of plate sections circumferentially arranged around the flange having their radially inner portion overlapping the opposite side of said flange, said sections being secured to the outer marginal portion of the hub plate so as to form an annulus maintained by said hub plate substantially in concentric relation to the hub for rotary displacement with respect thereto, said plate sections and said hub plate cooperating with the flange to prevent axial displacement relative to the hub in either direction, spring means cooperating with the flange for resiliently transmitting drive between the annulus and the hub, and rings of friction material supported on opposite sides of the annulus in substantially concentric relation with the hub and secured to and interconnecting all of said plate sections.

2. A spring cushioned clutch plate comprising a center hub having an annular flange and also having at least on one side thereof an annular shoulder provided thereon of smaller radius than the flange, a clutch plate structure carried thereby and movable rotatively relative thereto against spring resistance, comprising a hub plate having a central circular opening provided therein for rotatably mounting the same on the annular shoulder on the hub and a plurality of plate sections circumferentially arranged around the flange having their radially inner portions overlapping the opposite side of said flange and secured to the outer marginal portion of the hub plate, the plate sections and hub plate cooperating with the flange to prevent axial displacement relative to the hub in either direction, and spring cushioning means for resiliently transmitting drive between the hub and clutch plate structure, said flange radially outwardly from the shoulder and the points of engagement of said hub plate and plate sections being of reduced thickness so that appreciable portions of its opposite side faces are spaced from said hub plate and plate sections to minimize the transmission of vibration from the hub thereto, and said clutch plate structure carrying friction material thereon for drive purposes, the built-up sectional construction of said plate structure resulting in minimum sound amplification incident to whatever vibrations are transmitted thereto from the hub.

3. A spring cushioned clutch plate comprising a center hub having an annular flange provided thereon, said hub having provided thereon on one side of the flange a single relatively narrow annular bearing surface concentric with the hub for centering engagement therewith of the clutch plate structure, a sectional clutch plate structure comprising sections having portions extending radially inwardly on the opposite side of said flange from said bearing surface, a one-piece concentric ring member secured at circumferentially spaced points to the sections of said clutch plate structure and providing a single continuous inner annular bearing surface for engagement with the aforesaid annular bearing surface on the hub so as to mount the clutch plate structure in concentric relation with the hub for rotary displacement with respect thereto, the clutch plate sections and the ring member being disposed in spaced relation to opposite sides of the flange so as to prevent axial displacement of the clutch plate structure relative to the hub in either direction and prevent displacement of the ring member from the annular bearing surface on the hub, rings of friction material concentric with the hub secured on opposite sides of the clutch plate structure to interconnect sections thereof for drive purposes, the sectional construction of said clutch plate structure resulting in minimum sound amplification incident to whatever vibrations are transmitted thereto from the hub, and spring cushioning means for resiliently transmitting drive between the hub and clutch plate structure.

4. A spring cushioned vibration dampening clutch plate comprising a center hub having an annular flange with an annular bearing shoulder on one side thereof concentric with the hub, a friction material supporting annulus made up of a number of plate sections circumferentially arranged around the flange having the outer marginal portion thereof carrying the friction material and having the inner marginal portion thereof disposed in overlapping relation with one side face of the flange and fitting loosely around the hub, a hub plate having a central circular opening provided therein for rotatably mounting the same on the annular bearing shoulder, whereby said hub plate is held in concentric relation with the hub on the opposite side from the clutch plate sections, said clutch plate sections being secured to the outer marginal portion of the hub plate to form the annulus in substantially concentric relation to the hub, and said hub plate providing for rotary displacement of the annulus with respect to the hub while preventing axial displacement relative thereto, said flange having one or more openings provided therein for spring cushioning means, and spring cushioning means in said openings for transmitting drive resiliently between the annulus and hub.

W. VINCENT THELANDER.